United States Patent [19]
Etoh

[11] Patent Number: 4,967,358
[45] Date of Patent: Oct. 30, 1990

[54] SYSTEM AND METHOD FOR AUTOMATICALLY CONTROLLING A VEHICLE SPEED TO A DESIRED CRUISING SPEED

[75] Inventor: Yoshiyuki Etoh, Yokohama, Japan

[73] Assignee: Nissan Motor Company, Limited, Yokohama, Japan

[21] Appl. No.: 241,453

[22] Filed: Sep. 8, 1988

[30] Foreign Application Priority Data

Sep. 11, 1987 [JP] Japan .................. 62-227955

[51] Int. Cl.⁵ ............................. B60K 31/04
[52] U.S. Cl. .................. 364/426.04; 123/352; 180/179
[58] Field of Search ........... 364/426.04, 431.07; 123/352; 180/176, 179

[56] References Cited

U.S. PATENT DOCUMENTS

| | | | |
|---|---|---|---|
| 4,612,615 | 9/1986 | Murakami | 364/431.07 |
| 4,656,407 | 4/1987 | Burney | 123/352 |
| 4,698,762 | 10/1987 | Moriya et al. | 180/179 |

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruising speed are disclosed in which such a control is inhibited that the opening angle is adjusted toward a prohibiting range in which an engine output torque becomes substantially constant even if the opening angle of the throttle valve is increased more than necessary. At this time, the opening angle is adjusted to a predetermined limit angle (for example, 40 degrees) and a transmission gear position is controlled depending on a difference between an instantaneous vehicle speed and a target vehicle speed. Therefore, unnecessary opening of the throttle valve exceeding the predetermined limit beyond which little increase in the engine output torque occurs can be avoided. In addition, the throttle valve can immediately be controlled from the predetermined limit to a target opening angle at which the vehicle speed can be maintained at the target vehicle speed.

11 Claims, 4 Drawing Sheets

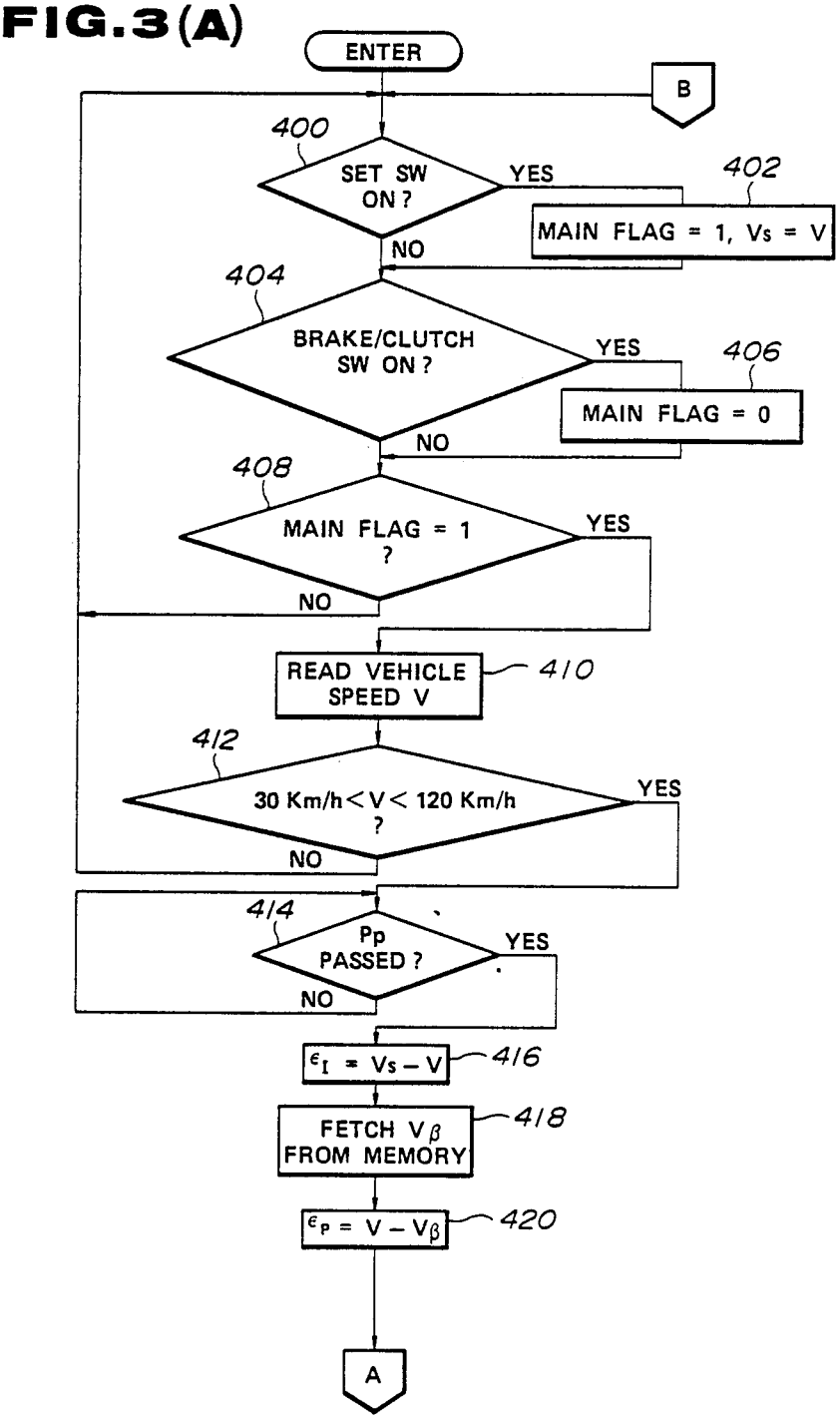

SYSTEM AND METHOD FOR AUTOMATICALLY CONTROLLING A VEHICLE SPEED TO A DESIRED CRUISING SPEED

BACKGROUND OF THE INVENTION (1) Field of the Invention

The present invention relates to a system and method for automatically controlling a vehicle speed to a desired cruising speed.

(2) Background of the Art

A Japanese Patent Application First Publication (non-examined) No. sho 47-35692 published on Nov. 25, 1972 exemplifies a system for automatically controlling a vehicle speed to a desired cruising speed through a control over an opening angle of an engine throttle valve.

In the above-identified Japanese Patent Application publication, an error $\epsilon_I$ between a target vehicle speed $V_s$ and actual vehicle speed V is derived in accordance with an equation expressed below for each predetermined control period (for example, 30 msec.).

$$\epsilon_I = V_s - V$$

In addition, a change rate error $\epsilon_p$ between an actual vehicle speed $V_B$ before one control period and the instantaneous vehicle speed $V_N$ is derived in accordance with an equation expressed below.

$$\epsilon_p = V_B - V_N$$

An opening angle adjustment quantity $\Delta\theta$ for an engine throttle valve is derived in accordance with an equation expressed below.

$$\Delta\theta = K_I \times \epsilon_I \pm K_p \times \epsilon_p,$$

wherein $K_I$ and $K_p$ are gain constants.

Therefore, the engine throttle valve is open or closed through an angular displacement indicated by an absolute value of $\Delta\theta$ of the adjustment quantity of the opening angle in a direction denoted by $\Delta\theta$. This permits the adjustment of an engine torque, thus the vehicle cruising at the target vehicle speed.

The engine torque characteristic is such that the engine torque is saturated when the opening angle of the throttle valve indicates 40 degrees through 80 degrees with respect to a fully closed position. Therefore, if the throttle valve opens through the above-described angle area, almost no increase in the engine torque occurs and therefore little increase in the vehicle speed results.

Consequently, the throttle valve is widely opened more than necessary with no acceleration of a vehicle in a case where the vehicle cruises on an ascending slope with a transmission gear selected at a high gear position.

In a case where the vehicle cruises on a road from the ascending slope to a flat, a control delay occurs until the throttle valve which has been opened widely during the slope run is returned to an opening angle through which the vehicle can cruise on the flat road causing the vehicle speed to excessively deviate from the target vehicle speed.

SUMMARY OF THE INVENTION

It is therefore an object of the present invention to provide a system and method for automatically controlling a vehicle speed to a desired vehicle speed which does not deviate from the target when the vehicle cruised from an ascending slope to a flat. The invention also prevents an excessive angular displacement of the engine throttle valve which results in little acceleration.

The above-described object can be achieved by providing a system for automatically controlling a vehicle speed to a desired cruising speed, comprising: (a) first means for detecting an instantaneous vehicle speed; (b) second means for setting a target vehicle speed at which the vehicle cruises; (c) third means for adjusting a variable of an engine output controlling mechanism of a vehicular engine so that the vehicle speed coincides with the target vehicle speed, the variable having a characteristic such that an engine output torque becomes substantially constant when the variable exceeds a predetermined limit; and (d) fourth means for inhibiting a control such that the adjusted variable falls in a range in which the engine output torque becomes substantially constant.

The above-described object can also be achieved by providing a system for automatically controlling a vehicle speed to a desired cruising speed, comprising: (a) first means for detecting a vehicle speed; (b) second means for setting a target vehicle speed at which the vehicle cruises; (c) third means for adjusting an opening angle of an engine throttle valve so that the vehicle speed coincides with the target vehicle speed, the opening angle of the throttle valve having a characteristic such that an engine output torque becomes substantially constant when the opening angle of the throttle valve exceeds a predetermined opening angle; and (d) fourth means for inhibiting a control such that the adjusted opening angle falls in a range in which the engine output torque becomes substantially constant.

The above-described object can also be achieved by providing a method for automatically controlling a vehicle speed to a desired cruising speed, comprising the steps of: (a) detecting an instantaneous vehicle speed; (b) setting a target vehicle speed at which the vehicle cruises; (c) adjusting an opening angle of an engine throttle valve of a vehicular engine so that the vehicle speed coincides with the target vehicle speed, the opening angle having a characteristic such that an engine output torque becomes substantially constant when the opening angle exceeds a predetermined opening angle limit; and (d) inhibiting a control of the automatic vehicle speed such that the adjusted opening angle falls in a range in which the engine output torque becomes substantially constant.

DETAILED DESCRIPTION OF THE PREFERRED EMBODIMENT

Reference will hereinafter be made to the drawings in order to facilitate understanding of the present invention.

Figure 1:
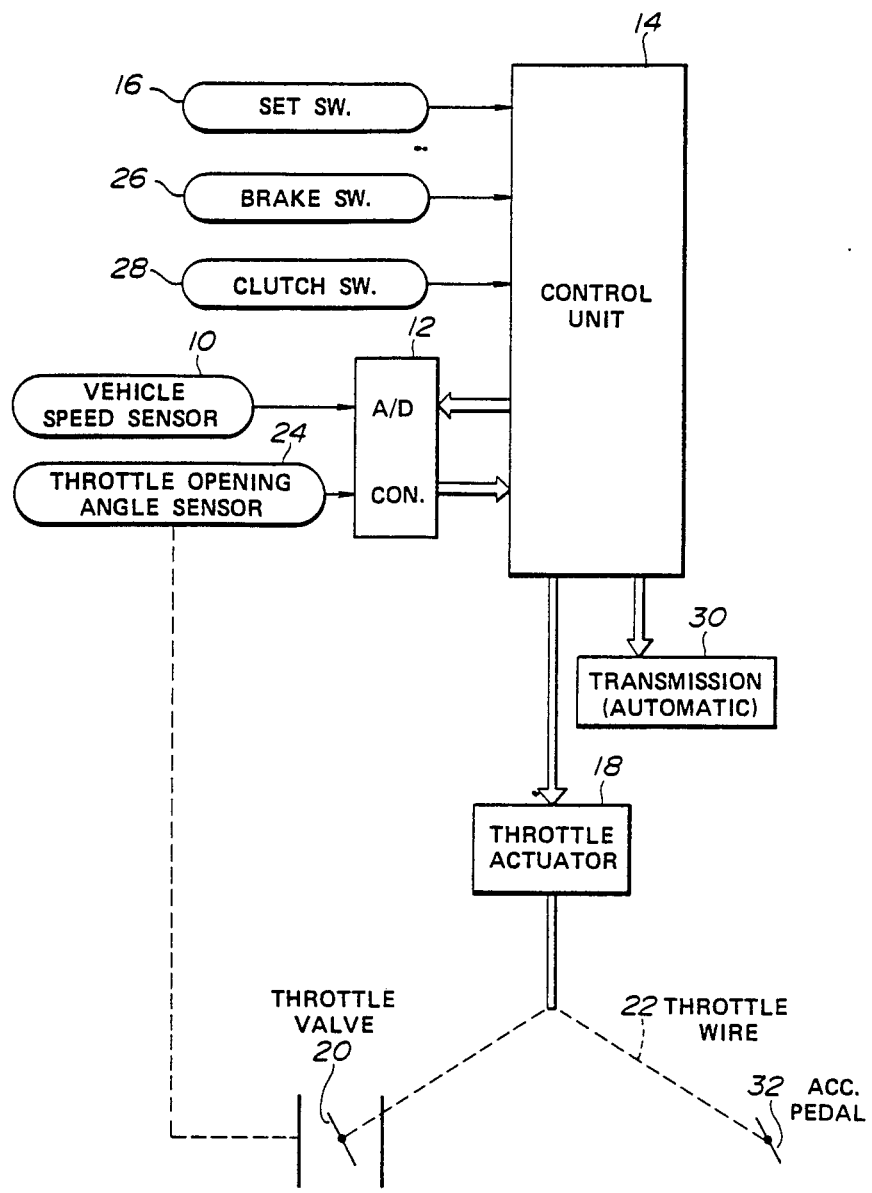
FIG. 1 is a circuit block diagram of a system for automatically controlling a vehicle speed to a desired vehicle speed in a preferred embodiment according to the present invention.

FIG. 1 shows a system for automatically controlling a vehicle speed to a desired vehicle speed in a preferred embodiment according to the present invention.

A vehicle speed sensor 10 detects the instantaneous vehicle speed of the vehicle. The detected vehicle speed is supplied to a control unit 14 via an A/D (analog-to-digital) converter 12.

A set switch 16 outputs a switch signal to the control unit 14. When the set switch 16 is turned to ON, the instantaneous vehicle speed detected by the vehicle speed sensor 10 is set as a target vehicle speed at which the vehicle cruises.

A throttle actuator 18 is controlled by means of the control unit 14. An engine throttle valve 20 is opened or closed (an angular displacement thereof is adjusted) by means of a throttle actuator 18 via a throttle wire 22.

The instantaneous opening angle of the throttle valve 20 is detected by means of a throttle valve opening angle sensor 24. The detected opening angle is supplied to the control unit 14 via the A/D converter 12.

Switch signals derived by a brake switch 26 and clutch switch 28 are supplied to the control unit 14 to release the cruise run of the vehicle upon receipt of the switch signal from the set switch 16.

It is noted that the control unit 14 executes a gear position control for a transmission 30 (automatic transmission).

The structure of the throttle actuator 18 is exemplified by copending U.S. patent application Ser. No. 043,468 and Ser. No. 043,532, the disclosures of which are hereby incorporated by reference.

Furthermore, the throttle valve 20 is opened and closed via the throttle wire 22 according to a depression operation on an accelerator pedal 32. It is noted that the throttle actuator 18 is operated to actuate the throttle valve 20 independently of the accelerator pedal 32.

Figure 2:
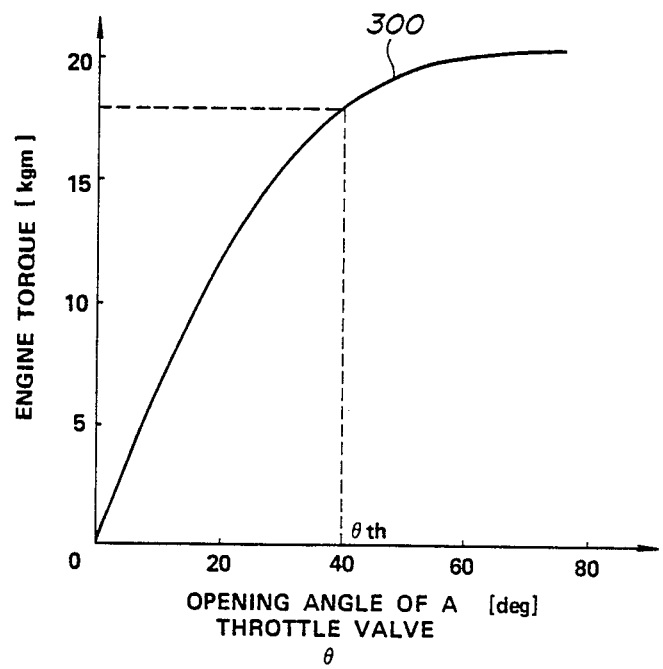
FIG. 2 is a characteristic graph of an engine torque with respect to an opening angle $\theta$ of an engine throttle valve.

FIG. 2 shows a characteristic graph representing an engine torque Te with respect to an opening angle $\theta$ of the throttle valve 20.

As shown in FIG. 2, the characteristic graph 300 of the engine torque Te becomes saturated when the opening angle $\theta$ falls in an area of 40 degrees to 80 degrees.

Figure 3B:
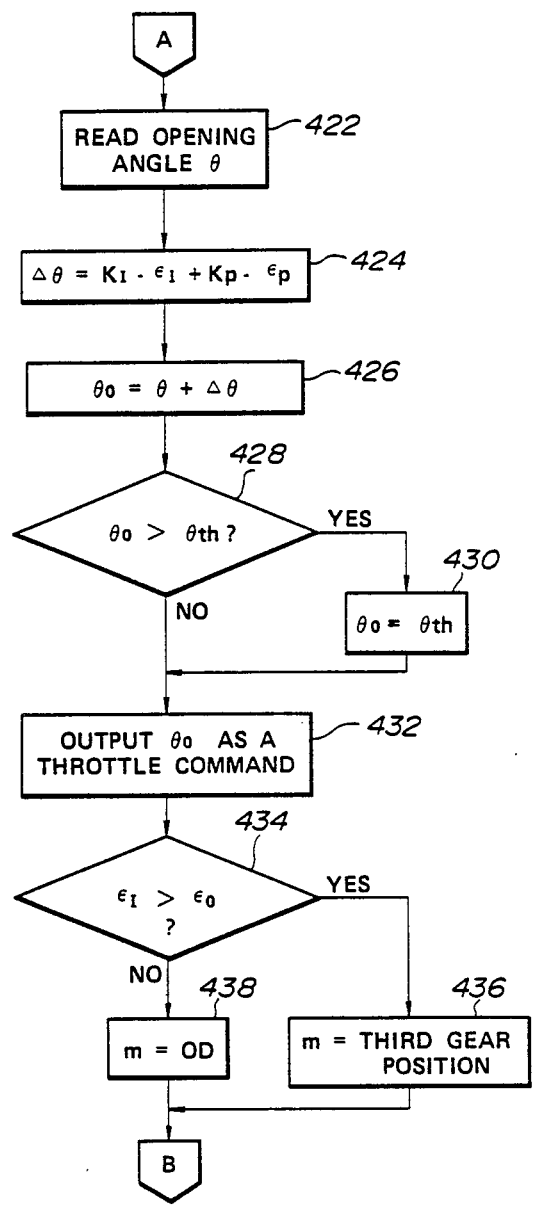
FIGS. 3(A and 3(B) are integrately an operational flowchart of a control program routine executed in the system shown in FIG. 1.

FIGS. 3(A) and 3(B) show integrally a flowchart of a program executed in the control unit 14.

In a step 400, the control unit 14 determines whether the set switch 16 is turned on.

When the set switch 16 is turned on (YES) in the step 400, the routine goes to a step 402 in which a main flag (MAIN FLAG) indicating that the cruise run is carried out is set and the detected vehicle speed V is set as a target vehicle speed $V_S$.

In a step 404, the control unit 14 determines whether either a brake switch 26 or clutch switch 28 is turned on through an operation of braking or clutching.

If either of the operations is confirmed (YES) in the step 404, the above-described main flag is reset in a step 406.

Furthermore, the control unit 14 determines whether the flag MAIN FLAG is set in a step 408. If not set (NO) in the step 408, the above-described processing is repeated, i.e., the routine returns to the step 400.

If the main flag is set (YES) in the step 408, the routine goes to a step 410 in which the instantaneous vehicle speed V detected by the speed sensor 10 is fetched and the routine goes to a step 412 in which the control unit 14 determines whether the detected vehicle speed V falls within a speed range between 30 Km/h and 120 Km/h (cruising allowable range).

If V is equal to or below 30 Km/h or V is equal to or higher than 120 Km/h (NO) in the step 412, the routine returns to the step 400.

If V is in the above-described speed range (YES) in the step 412, the routine goes to a step 414 in which the present time is checked to determine if it exceeds a predetermined period $P_p$ (for example, 300 msec.).

Upon confirmation that the control period has elapsed (YES in the step 414), the instantaneous detected vehicle speed V is subtracted from the target vehicle speed $V_S$ to derive an integral error $\epsilon_I$, i.e..

$\epsilon_I = V_S - V$ (step 416)

Then the detected vehicle speed $V_B$ at the previous control period is read in at step 418.

A proportional error $\epsilon_p$ of the vehicle speed is derived in accordance with the following equation.

$\epsilon_p = V - V_B$ (step 420)

If the integral error $\epsilon_I$ and proportional error $\epsilon_P$ are derived, the instantaneous opening angle $\theta$ of the throttle valve 20 (detected by the throttle valve opening angle sensor 24) is fetched in a step 422, the opening angle adjustment quantity $\Delta\theta$ (error function) of the throttle valve 20 is derived using gain constants $K_I$ and $K_p$.

$\Delta\theta = K_I \times \epsilon_I + K_p \times \epsilon_p$ (step 424)

Next, in a step 426, the opening angle adjustment quantity $\Delta\theta$ and detected opening angle $\theta$ are added so that a target angle ($\theta_o = \theta + \Delta\theta$) can be derived in a step 426.

In a step 428, the above-described target opening angle $\theta_o$ is compared with a predetermined opening angle $\theta_{th}$.

It is noted that the angle $\epsilon_{th}$ is set to 40 degrees as shown in FIG. 2. In addition, if the throttle valve 20 is opened more widely than 40 degrees, the engine torque $T_e$ is hardly increased. In an excessive opening angle area exceeding 40 degrees, the engine torque becomes substantially constant.

Only when the control unit 14 confirms that the target opening angle $\theta_o$ exceeds the set opening angle $\theta_{th}$ when comparing the set opening angle $\theta_{th}$ with the target opening angle $\theta_o$ is forcefully clamped to the set opening angle $\theta_{th}$ in a step 430 and the throttle valve 20 is inhibited from opening more widely than the set opening angle $\theta_{th}$.

In the way described above, when the target opening angle $\theta_o$ is limited below the set opening angle $\theta_{th}$, a control signal for opening or closing the throttle valve 20 so as to coincide with the target opening angle $\theta_o$ is output to the throttle actuator 18 in a step 432.

It is noted that when the control signal for the cruise control is output, the integral error $\epsilon_I$ of the vehicle speed is compared with the set value $\epsilon_o$ in a step 434. When the error $\epsilon_I$ exceeds a measurement error $\epsilon_o$ (YES in the step 434), the transmission gear position is placed in a third gear (in a step 436). If the error $\epsilon_I$ is below the measurement error $\epsilon_o$ (NO in the step 434), the transmission 30 is placed in an overdrive position in a step 438.

As described hereinabove, if the control attempts to open the throttle valve 20 more than 40 degrees steps 428–430 inhibit the control. The throttle valve 20 does not open to the excessively wide opening angle area in which almost no engine torque increase occurs and the vehicle speed does not increase. In addition, during the end of the ascending slope run, the throttle valve 20 is more readily closed toward the target opening angle $\theta_o$ so that vehicle speed can be maintained at the target vehicle speed $V_s$.

Consequently, a wasteful consumption of engine fuel and engine noise can be suppressed and the excessive vehicle speed increase can be prevented.

It will fully be understood by those skilled in the art that the foregoing description is made in terms of the preferred embodiment and various changes and modifications may be made without departing from the scope of the present invention which is defined by the appended claims.

What is claimed is:

1. A system for automatically controlling a vehicle speed to a desired cruising speed, comprising:
   (a) first means for detecting an instantaneous vehicle speed;
   (b) second means for setting a target vehicle speed at which the vehicle cruises based on said detected instantaneous vehicle speed;
   (c) third means for adjusting a variable of the engine output controlling mechanism of a vehicular engine so that the instantaneous vehicle speed coincides with the target vehicle speed the variable having a characteristic such that an engine output torque becomes substantially constant when the variable exceeds a predetermined limit; and
   (d) fourth means for inhibiting the automatic vehicle speed control when the adjusted variable falls in a range in which the engine output torque becomes substantially constant.

2. A system as set forth in claim 1, wherein the engine output controlling mechanism is a throttle valve installed in an intake air passage of the engine and the variable is an opening angle of the throttle valve.

3. A system as set forth in claim 2, wherein the predetermined limit is substantially 40 degrees with respect to a fully closed position of the throttle valve.

4. A system for automatically controlling a vehicle speed to a desired cruising speed, comprising:
   (a) first means for detecting an instantaneous vehicle speed;
   (b) second means for setting a target vehicle speed at which the vehicle cruises based on said detected instantaneous vehicle speed;
   (c) third means for adjusting a variable of the engine output controlling mechanism of a vehicular engine so that the instantaneous vehicle speed coincides with the target vehicle speed, the variable having a characteristic such that an engine output torque becomes substantially constant when the variable exceeds a predetermined limit, said third means comprising:
      fifth means for deriving an integral error $\epsilon_I$ between the instantaneous vehicle speed and target vehicle speed;
      sixth means for deriving a proportional error $\epsilon_p$ between the instantaneous vehicle speed and vehicle speed before one control period;
      seventh means for deriving the adjusted variable $\phi\eta$ on the basis of the integral and proportional errors;
      eighth means for detecting an instantaneous variable of the engine output controlling mechanism;
      ninth means for deriving a target variable of the engine output controlling mechanism from the adjusted variable $\phi\eta$ derived by the seventh means and the instantaneous variable $\eta$ detected by the eighth means; and
      tenth means for activating the engine output controlling mechanism so as to adjust the instantaneous variable to the target variable derived by the ninth means; and
   (d) fourth means for inhibiting the automatic vehicle speed control when the adjusted variable falls in a range in which the engine output torque becomes substantially constant.

5. A system as set forth in claim 4, wherein the fourth means comprises: (a) eleventh means for determining whether the target variable exceeds a predetermined value; and (b) twelfth means for limiting the target variable to the predetermined valve when the target variable exceeds the predetermined valve limit.

6. A system as set forth in claim 5, which further comprises: (a) thirteenth means for determining whether the integral error exceeds a predetermined integral error; (b) fourteenth means for changing a gear position of a vehicular transmission depending on the result of determination by the thirteenth means.

7. A system as set forth in claim 6, wherein the fourteenth means changes the gear position to a third gear when the integral error is less than the predetermined integral error and to an overdrive when the integral error is greater than or equal to the predetermined integral error.

8. A system as set forth in claim 7, wherein the vehicular transmission is an automatic transmission with the overdrive mechanism.

9. A system for automatically controlling a vehicle speed to a desired cruising speed, comprising:
   (a) first means for detecting a vehicle speed;
   (b) second means for setting a target vehicle speed at which the vehicle cruises;
   (c) third means for adjusting an opening angle of an engine throttle valve so that the vehicle speed coincides with the target vehicle speed, the opening angle of the throttle valve having a characteristic such that an engine output torque becomes substantially constant when the opening angle of the throttle valve exceeds a predetermined opening angle; and
   (d) fourth means for inhibiting the automatic vehicle speed control when the adjusted opening angle falls in a range in which the engine output torque becomes substantially constant.

10. A method for automatically controlling a vehicle speed to a desired cruising speed, comprising the steps of:
   (a) detecting an instantaneous vehicle speed;
   (b) setting a target vehicle speed at which the vehicle cruises based upon said instantaneous vehicle speed;
   (c) adjusting an opening angle of an engine throttle valve of a vehicular engine so that the instantaneous vehicle speed coincides with the target vehicle speed, the opening angle having a characteristic such that an engine output torque becomes substantially constant when the opening angle exceeds a predetermined limit opening angle; and
   (d) inhibiting the automatic vehicle speed control when the adjusted opening angle falls in a range in which the engine output torque becomes substantially constant.

11. A system for automatically controlling a vehicle speed to a desired cruising speed, comprising:
   (a) first means for detecting an instantaneous vehicle speed;
   (b) second means for setting a target vehicle speed at which the vehicle cruises based on said detected instantaneous vehicle speed;
   (c) third means for adjusting calculating a target opening variable of an engine output controlling mechanism on the basis of said detected instantaneous vehicle speed and said target vehicle speed and for adjusting an instantaneous operating variable of an engine output controlling mechanism so that said instantaneous operating variable coincides with said target operating variable and said detected instantaneous vehicle speed coincides with said target vehicle speed, said instantaneous operating variable having a characteristic such that an engine output torque becomes substantially constant when said instantaneous operating variable a predetermined limit; and
   (d) fourth means for determining whether said target operating variable exceeds a predetermined limit and for limiting said target operating variable to said predetermined limit when said target operating variable exceeds said predetermined limit.

* * * * *